May 3, 1927.
J. J. HIGGINS
1,626,678
COMBINATION INSERTING AND WELDING MACHINE
Filed Dec. 31, 1923     3 Sheets-Sheet 2
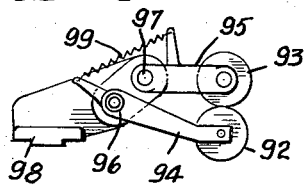
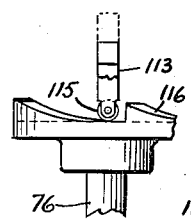
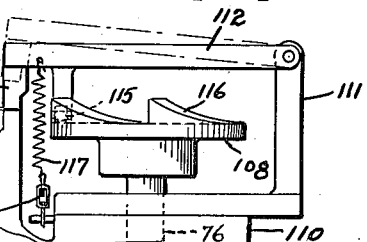
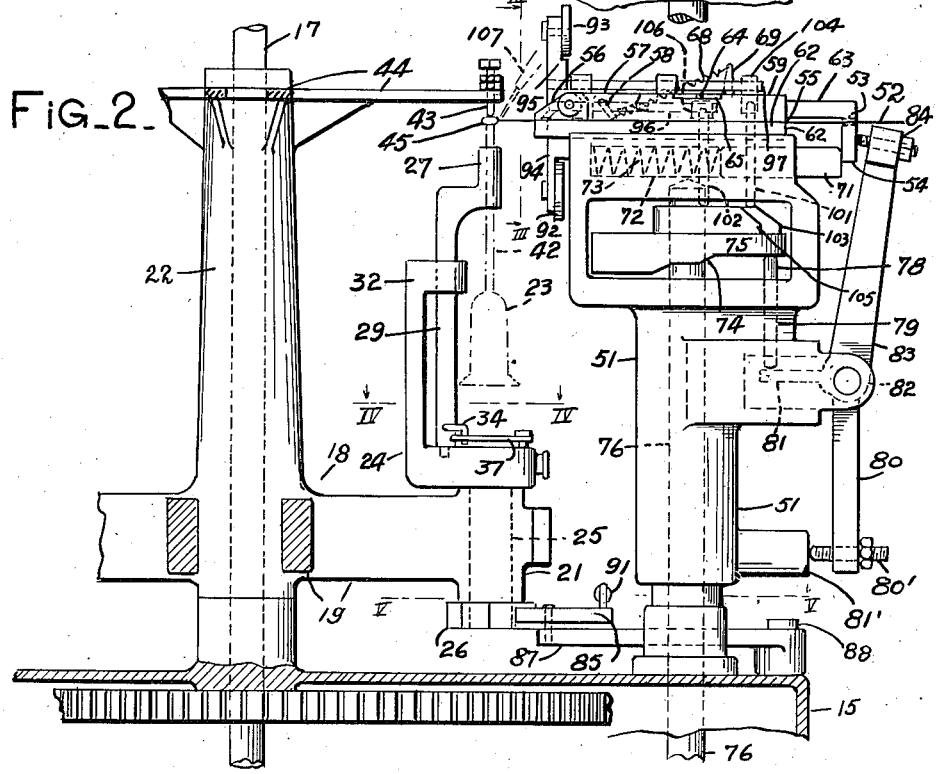
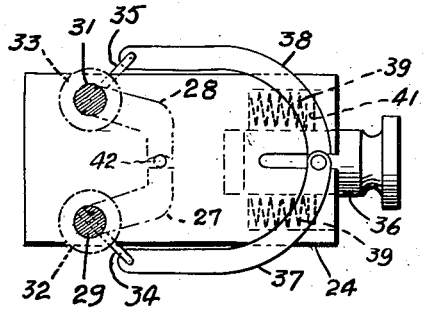
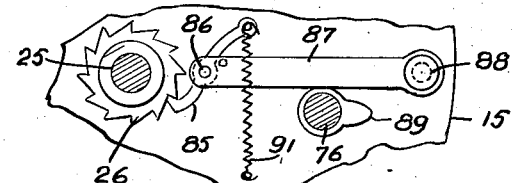
INVENTOR
JOHN J. HIGGINS
BY
ATTORNEY

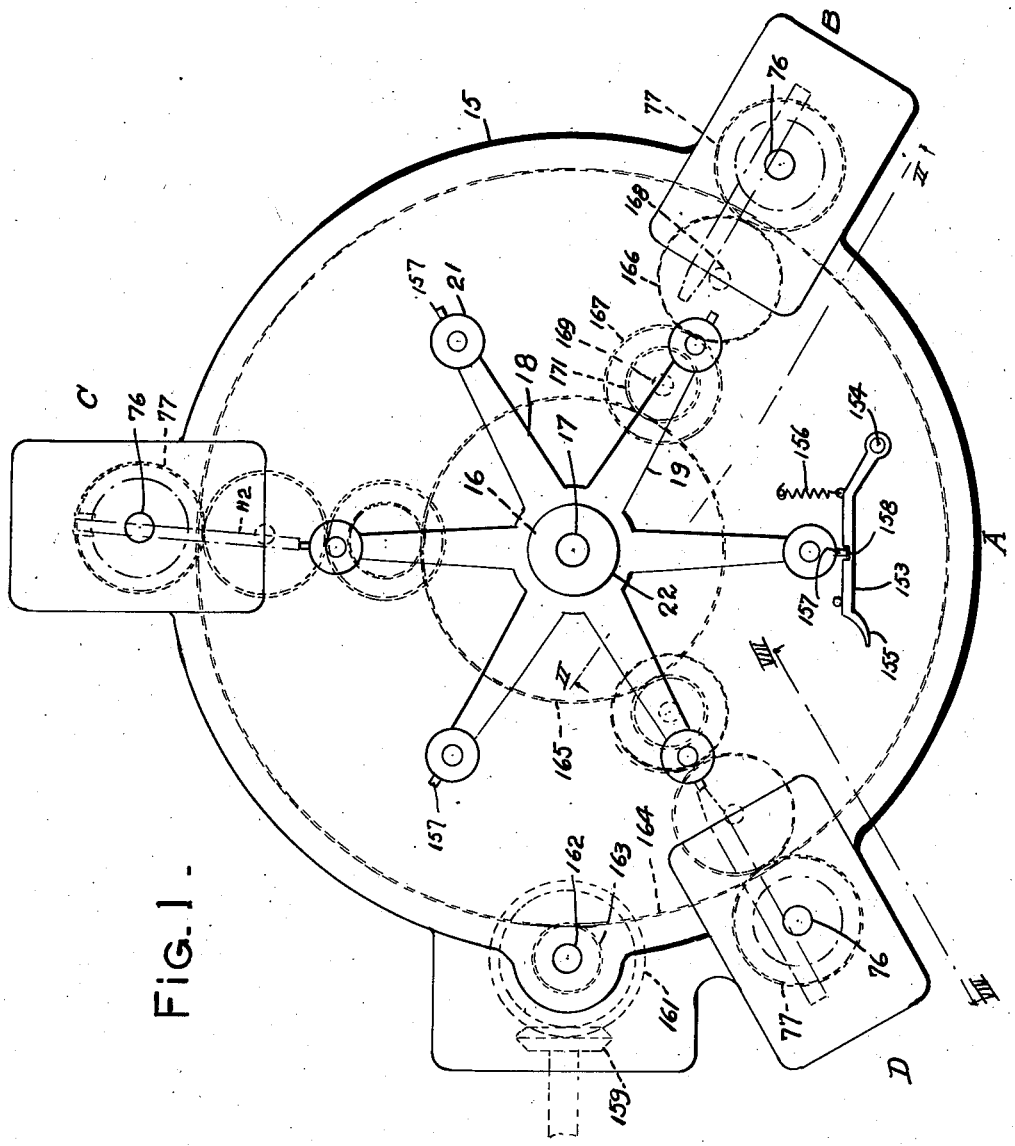

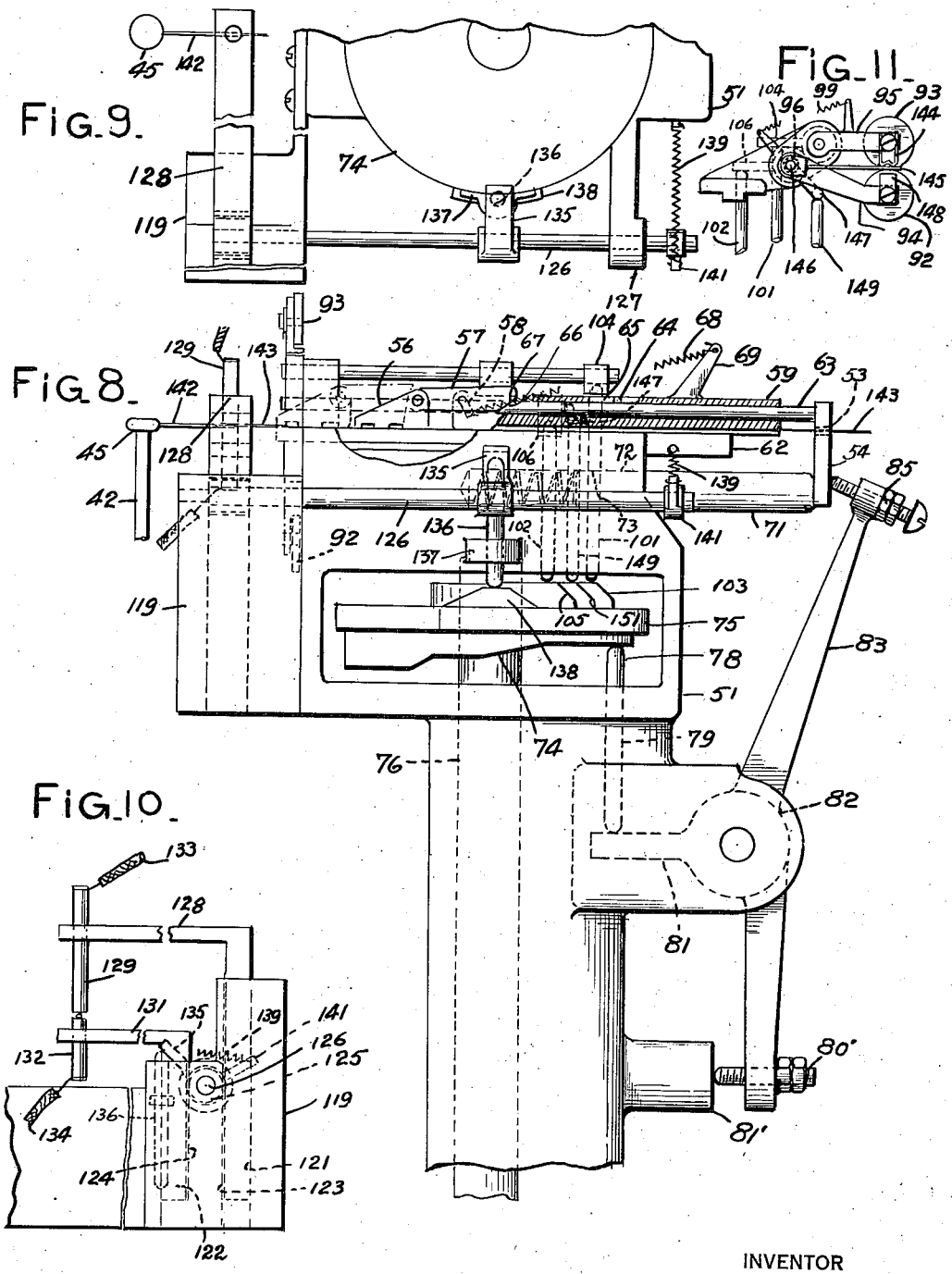

Patented May 3, 1927.

1,626,678

UNITED STATES PATENT OFFICE.

JOHN JOSEPH HIGGINS, OF EAST ORANGE, NEW JERSEY, ASSIGNOR TO WESTING-HOUSE LAMP COMPANY, A CORPORATION OF PENNSYLVANIA

COMBINATION INSERTING AND WELDING MACHINE.

Application filed December 31, 1923. Serial No. 683,574.

This invention relates to lamp making machinery and particularly to machines for inserting support wires into lamp stems.

An object of the invention is to provide a machine for expeditiously and automatically uniting a plurality of wires and inserting an end of said united wires into a lamp part.

Another object of the invention is to provide a machine for handling and positioning a plurality of different dimensioned wires and for automatically uniting two or more of said wires together and inserting a plurality of united wires radially about a lamp stem.

A further object of the invention is to provide coordinating machine elements for welding together two lengths of wire of different diameters, positioning a lamp stem in operative relation to the welding mechanism and subsequently inserting the wires radially in a lamp stem and forming loops at the free ends of said wires.

Other objects and advantages will be apparent as the description proceeds.

In the manufacture of certain larger types of electric incandescent lamps, it is necessary to provide support wires of relatively large diameter to hold the filament in its proper position as a light source.

When using the small type of lamp, the relatively small caliper support wires employed are of a highly refractory material, such as tungsten or molybdenum and the stems of such lamps are generally formed from hard glass. The cofficient of expansion of the supports is such, that when the ends thereof are inserted into the glass stem, no defects, such as cracks, result. However, in the large type of lamp, a soft glass is used, for manufacturing reasons, and when supports of molybdenum or like material of a relatively large diameter are used, to have strength enough for supporting filaments of this type of lamp, cracked stems often result by reason of the difference of coefficients of expansion of the glass and the inserted supports.

It has, therefore, been found desirable to use another material for the supports such, for example, as nickel wire, but since the fusing point of nickel is comparatively low, it would not be practical to hang the filament in contact with the nickel owing to the high temperature of the filament when in operation. It has been found desirable to make a combination support from a length of nickel wire welded or otherwise secured to a length of another wire, such as molybdenum, which latter mentioned wire is preferably of a smaller diameter than the nickel wire.

The nickel portion of the support wire is inserted into the button of a lamp stem and a hook or loop is formed at the projecting or free end of the molybdenum wire for the reception of the filament.

The present invention, therefore, aims to provide an automatic mechanism for inserting a length of nickel wire into the button of a lamp stem, weld or otherwise secure the molybdenum wire to the projecting end of the nickel wire and to subsequently and automatically form a loop at the end of the molybdenum wire.

Most of the mechanism employed to perform the foregoing operations is well known in the lamp art, for example, the mechanism for supporting a stem and inserting a wire therein is known as an inserting mechanism and such mechanism may be similar to that shown in application of Madden and Higgins, Serial No. 556,957, filed April 27, 1922, for combined button making and inserting machine, and assigned to the Westinghouse Lamp Company.

In the present invention, however, certain elements have been added and others have been eliminated. For example, mechanism for forming or grooving the end of nickel wire has been added. This mechanism has for convenience, been shown as operating through the agency of a vertically rotating shaft, similar to that for operating the wire-inserting mechanism.

Other mechanism, such as welding jaws, has also been added and so arranged as to be operated by certain mechanical elements which are found in the wire-inserting heads.

The present invention includes many new operations and a new combination of elements and a new result is attained.

A machine for carrying out the invention may be briefly described as comprising a plurality of mechanisms, so positioned and associated with a source of energy, as to operate upon lamp parts properly positioned by a conveyor for transporting lamp parts from one mechanism to another.

A lamp stem may be positioned in the conveyor and moved from one mechanism to another. For example, a stem may be moved to mechanism for inserting a length of nickel wire, thence to a mechanism for forming the end of the nickel wire, after which it may travel to a mechanism for positioning a molybdenum wire adjacent the nickel wire at which time welding jaws are operated to unite the two wires and subsequently form a loop at the end of the molybdenum wire. The conveyor may then be returned to its initial position, the stem removed and another placed in position for a repetition of the foregoing operations.

It is to be understood that each of the above mentioned mechanisms may perform a series of operations upon each lamp stem; that is, a plurality of nickel support wires may be inserted, the stem-holder being intermittently and automatically rotated so that the supports are inserted radially into the stem. The stem-holder may be similarly rotated when in operative relation with each of the other mechanisms, so that the finished stem will have the required number of supports, depending upon the type of lamp to be produced.

The invention will be more fully understood by reference to the accompanying drawings, in which—

Fig. 1 is a plan view, partly diagrammatic, of a machine embodying the invention;

Fig. 2 is an elevational view, partly in section, of a portion of the machine taken on line II—II in Fig. 1;

Fig. 3 is a front view of wire cutting mechanism and may be considered as taken on line III—III in Fig. 2;

Fig. 4 is a view taken on line IV—IV in Fig. 2;

Fig. 5 is a fragmentary view showing a portion of the machine taken on line V—V in Fig. 2;

Fig. 6 is a fragmentary view of a portion of the machine employed for forming a groove at the end of a wire;

Fig. 7 is a front fragmentary view of the grooving machine shown in Fig. 6;

Fig. 8 is an elevational view, partly in section, showing mechanism for positioning a wire in welding relation to another wire and also shows a mechanism for performing a welding and hook-forming operation; this view may be considered as taken on line VIII—VIII in Fig. 1;

Fig. 9 is a partial plan view of the machine shown in Fig. 8, showing only mechanism for performing the welding operation;

Fig. 10 is a front elevational view of the welding apparatus shown in Figs. 8 and 9;

Fig. 11 is a side view of mechanism for forming a loop at the end of a wire;

Fig. 12 shows a support wire consisting of wires of two different diameters joined together, one of the wires having been grooved to facilitate the joining operation, and Fig. 13 shows a support consisting of two wires, one of the wires having been flattened to facilitate its union with another wire.

A machine embodying the present invention may include a bed-plate 15 having a central hub 16, in which a shaft 17 may be secured and mounted rotatably upon the shaft 17 is a spider or conveyor 18, which, in the present embodiment of the invention, is provided with six radial arms 19. Each of said arms may terminate in a hub 21 and may be integral at their opposite ends with a relatively long vertical bearing 22 (see Fig. 2).

The conveyor 18 may be arranged for manual rotation to carry work parts, such, for example, as an incandescent lamp stem 23, from one station to another. Any suitable type of stem-holder may be employed. The one shown may comprise a bracket 24 having a shaft 25 integral therewith and rotatable in the hub 21 of an arm 19. The shaft may project downwardly through the hub and have fastened thereto a ratchet wheel 26, the function of which will be hereinafter more fully described.

The stem-holder may be provided with a pair of oscillatory jaws 27 and 28 provided at the upper ends of vertical spindles 29 and 31, respectively. The spindles may be disposed in sockets in the bracket 24 and journaled in upright-guide bearings 32 and 33, which constitute part of the bracket 24. The spindles 29 and 31 are provided with lever arms 34 and 35 which are connected to a push rod 36 by links 37 and 38. The push rod 36 is reciprocable in the socket in the bracket 24 and is normally urged outwardly by springs 39, which engage with projections 41 on the push rod. Thus, by reason of the linked connection between the push rods and the jaws 27 and 28, the jaws will be normally held closed. To open the jaws, an operator applies a slight pressure upon the push rod and, after positioning an arbor portion 42 of a stem, may release the push rod and the stem will be held in position.

The proper vertical position of a stem may be regulated by bringing the button portion of the stem in contact with a set screw 43 positioned at the free end of an arm 44, the arm being integral with the vertical bearing 22 of the conveyor. The set screw may be adjusted to permit a variation in the position of the stem when in the holder. An arm, such as the arm 44, may be provided over each of the arms 19 of the spider.

The foregoing description sets forth that portion of the apparatus employed for transporting a work part from station to station for the progressive operations, which may briefly be described as a loading operation which is performed at "A" (see Fig. 1); after which the conveyor moves the work part to position "B", whereupon the relatively large section of wire is inserted into a button 45 of the stem 23. The conveyor may then be moved to bring the stem with the inserted wire to position "C", at which time mechanism operates to either flatten or groove the end of the inserted wire, after which the conveyor is moved to position "D" and the relatively small diameter wire is projected and disposed in proper relation to the groove or flattened wire. Welding jaws are then operated to connect the two wires, whereupon the small diameter wire is severed and a hook or pig-tail is formed at the end thereof. The conveyor is then moved to bring the stem to the loading position, at which station it is removed.

The foregoing description follows the operation of the stem during the insertion of a single support and it is to be understood that the operations upon a stem may be repeated at each station, the stem being intermittently rotated in accordance with the number of support wires required for the particular type of stem produced.

The operation of inserting the relatively heavy wire may be performed by mechanism shown more clearly in Fig. 2. The position of such mechanism is indicated at station "B" in Fig. 1. This inserting mechanism may comprise a bearing bracket 51 suitably secured to the bed-plate 15. Relatively heavy wire 52 may be fed from a suitably positioned reel (not shown), see Fig. 2 and Fig. 8. The wire 52 may then be threaded through an eyelet 53 in a depending arm 54 and may be led through a groove 55 and beneath a jaw 56 pivoted upon a lever member 57, which member is secured to a transverse shaft 58 having its bearing at an end of a reciprocable part 59, the latter being slidable in a guide 62 at the upper end of the bracket 51.

The movable part 59 may be provided with a cylindrical bore, in which a plunger 63 is reciprocable; the plunger being secured at its free end to the depending arm 54. A pin 64, secured to the plunger 63 and positioned in a slot 65 of the part 59 limits the movement of the plunger, which has its inner end 66 (see Fig. 8) tapered to engage with a tapered surface 67 at one end of the lever member 57. When the plunger is thrust to make contact with the lever member, this member is actuated and transmits a force to the jaw 56, causing it to press firmly upon and secure the wire 52. Normally, the jaw 56 is lightly pressed upon the wire by reason of the action of a spring 68 secured to a rigid arm 69 integral with the reciprocable part 59 and to the end of the shaft 58 which may be bent to provide a lever arm. Thus, the contracting action of the spring 68 tends to rotate the shaft 58 and exert a downward pressure upon the jaw 56. A light tensional force upon the jaw is sufficient to feed it from the spool when the part 59 is actuated. It is necessary, however, to provide a firmer grip upon the wire, since it is inserted into a button by the forward movement of the reciprocable part 59, hence the provision of the plunger 63 during the inserting operation forces one end of the lever 57 upwardly to press the jaw 56 firmly upon the wire.

The above described mechanism for gripping a wire and moving it through a given path to insert an end thereof into a button is known in the art and the particular reciprocable mechanism which moves the wire is termed a "ram" and will be hereinafter so designated. The ram is normally maintained in a remote or outer position ready to feed wire from a spool by means which comprise a rod 71, movable in a recess 72 and maintained in contact with the depending arm 54 under the action of a spring 73 positioned in the recess 72.

Thus, the plunger 63 may be moved outwardly until the pin 64 reaches an end of the slot 65, whereupon the spring 73 may continue to act to move the entire ram outwardly to its initial position. The inward movement of the ram is effected through the action of a cam 74 upon the under side of a cam-carrier 75 secured to a vertical shaft 76 journaled in the bracket bearing 51. The shaft 76 may be provided at its lower end with a spur gear 77 (see Fig. 1), and may be rotated to actuate the cam 74 by mechanism to be later described.

Movement may be translated from the cam 74 through a vertical rod 78 disposed in a vertical aperture 79 in the bracket 51. The upper end of the rod 78 may be positioned in the path of movement of the cam 74 and the lower end may be disposed in contact with an arm 81 of a bell-crank 82, an upper arm 83 of which is provided with a set screw 84 adapted to make contact with the depending arm 54 of the ram. It will, therefore, be evident that a rotation of the cam wheel 74 will result in a movement of the arm 81 to cause an inward movement of the ram, the return movement of which is effected through the action of the spring 73. The bell-crank 83 may be provided with a projection 80 having a set screw 80' adapted to engage with a stop 81' to limit the outward movement of the ram.

It will be appreciated that the cam face may be of such configuration as to provide for the proper movement of the ram, in order to effect an intermittent forward feed of the support wire. It will be evident that when the conveyor is rotated to position a stem in proper relation to the inserting head, as shown in Fig. 2, means may be provided for intermittently rotating the stem for the successive insertion of lengths of wire in radial formation.

A partial rotation of the stem is effected by providing mechanism well known to this class of machines. Such mechanism may comprise the ratchet wheel 26, above referred to, positioned to engage with a pawl 85 pivoted to a pin 86 on one end of an arm 87 when the stem-holder is disposed in a given relation to the wire-inserting mechanism. The arm 87 may be hinged on a pin 88 secured to the bed-plate of the machine and positioned in operative relation to a cam 89 secured to the shaft 76, which operates the wire inserting mechanism.

It will be evident that with each rotation of the shaft 76, which results in an insertion of a length of wire into a button, a movement of the arm 87 will be caused with a constant partial rotation of the stem holder by reason of the ratchet and pawl 26 and 85.

A spring 91, secured to an end of the pawl 85 and to a pin secured to the bed-plate 15, acts to return the arm to its normal position when free from engagement with the cam 89.

It will be seen that the ratchet wheel 26 may be provided with any suitable number of teeth and the movement of the ratchet may be varied accordingly, depending upon the number of supports or lengths of wire to be inserted into a stem, or means may be provided for automatically terminating the wire inserting mechanism, after a given number of supports have been inserted.

After each insertion, it is essential to sever the support wire and for this purpose, a pair of cutting members 92 and 93 (see Fig. 3) are provided. The cutting members are mounted at the ends of arms 94 and 95 secured to shafts 96 and 97. The shaft 96 is in the form of a hollow spindle so that the same cutting mechanism may be employed in connection with the wire bending mechanism. The shafts are journaled in a removable bracket 98 which may be suitably fastened to one side of the upper end of the bearing bracket 51 and so positioned, as to arrange the cutters to sever the wire after the ram has retreated to its outer position. A spring 99 secured to the arm 95 and to the arm 92, serves to normally hold the cutters apart. Mechanism for operating the cutters may comprise vertical rods 101 and 102 (see Fig. 2). The rod 101 may be positioned in a suitable aperture in the bracket 51 and have one end thereof in contact with a cam surface 103 and the other end disposed for engagement with a lever arm 104 secured to the shaft 97. The rod 102 may be similarly disposed within the bracket 51 and an end thereof may be positioned to make contact with a cam 105 and the other end arranged to engage with a lever arm 106 secured to the shaft 96.

The cams 103 and 105 may be integral with the cam-carrier 75 and so formed that a rotary movement of the carrier will operate the cams to actuate the cutters in the proper timed relation with the movement of the ram to sever the wire. The cam arrangement acting by reason of the rotary movement of the shaft may be such, as to effect a performance of the inserting and cutting operations in the proper sequence. Thus when the arm 19 is positioned adjacent to the wire-inserting mechanism, a plurality of lengths of wire may be inserted into a button.

Means may be provided for locally heating the button to render plastic a portion thereof for the insertion of a length of wire and burner 107, indicated in dotted lines in Fig. 2, may be provided and the flame thereof directed to render plastic a portion of the button for the entrance of the end of a support wire.

After the proper number of relatively-heavy support wires have been inserted into a stem, the conveyor is moved to bring the stem into operative relation with mechanism for forming a longitudinal groove at the end of the projecting inserted wires. The mechanism may operate, if desired, to flatten the ends of the wires instead of grooving them. The station at which the grooving operation is performed, is indicated in Fig. 1 as "C". Such mechanism may comprise a cam plate 108 secured to the upper end of a shaft 76. The shaft 76 may be journaled in a vertical bearing bracket 110 similar to the bracket 51 shown in Fig. 2, although certain parts thereof may be omitted.

The lower end of the shaft 76 may be provided with a spur gear 77 and the cam rotated by mechanism similar to that which will be described for operating the inserting head above referred to. The bracket 110 is provided with a vertical post 111 and pivoted thereon is an arm 112 provided with a hammer 113 at its free end. The hammer may be of wedge-shape to press a V-shaped groove at the end of a filament wire.

An anvil 114 is provided as a support for a filament wire during the grooving operation. The arm 112 is caused to rise and fall through the engagement of a roller 115 secured to the arm, which is positioned to traverse inclined faces 116 as the cam plate 108 rotates. The cam faces are so arranged as to permit the roller to drop in a substantially vertical direction after a given upward movement thereof, thus causing the hammer 113 to move toward the anvil 114.

A predetermined impact upon a wire may be caused by a spring 117 having one end thereof secured to the arm 112 and the opposite end secured to the bracket 110. Thus, when the roller 115 reaches the limit of an inclined face 116 and moves from the cam face, the spring is free to contract and a given downward impact of the hammer upon a positioned wire results.

For the purpose of varying the degree of impact upon the wire, the spring may be provided with a turn buckle 118 which may be adjusted to expand or contract the spring to the proper degree for imparting the required force to the hammer. It will be understood that the number of inclined faces 116 may correspond to the number of wires inserted in a given type of stem.

Mechanism for positioning the support wires successively upon the anvil may be similar to the mechanism for intermittently rotating the stem as described above, in which case, the cam 89 would be positioned on the shaft 76.

After each of the previously inserted wires have been shaped by a compression between the hammer and the anvil, the conveyor 18 may be rotated to bring the stem to position for a welding operation, which position is indicated by the letter "D" in Fig. 1. Mechanism for thrusting a wire to position so that it overlaps the flattened or V-shaped end of the inserted wire, is more clearly shown in Fig. 8 and mechanism for welding these overlapping wires is also shown in Figs. 9 and 10.

It will be evident that the conveyor may readily be moved so that the stem holder positions one of the inserted wires in given relation to mechanism for performing a welding operation. As shown, such welding means may comprise a casing 119 having gear racks 121 and 122 positioned in parallel relation and having oppositely disposed teeth 123 and 124 in mesh with a pinion 125. The pinion may be mounted on a shaft 126 journaled in the casing 119 and in an extended bearing 127 (see Fig. 9) secured to the bearing bracket 51, the casing being also fastened to and extending from the bearing bracket.

By reason of the association between the pinion and the racks, a rotation of the pinion will cause a reciprocation of the racks in opposite directions. The rack 121 is provided with an extension 128 having a welding member 129 secured adjacent an end thereof and suitably insulated therefrom. The rack 122 is provided with an extension 131 and is also provided with a welding member 132 suitably insulated therefrom. The welding members are arranged upon a common vertical axis and by reason of the gear-wheel 125, may be moved to compress wires disposed between their ends.

The welding member 129 may have an electrical conductor 133 and the member 132 may have a similar conductor 134 through which electrical current may pass to perform the welding operation, the conductors being connected with a source of energy in the usual manner. An operation of the welding members may be effected by providing the shaft 126 with a lever arm 135 positioned to engage with a slide rod 136 movable in a bearing 137 integral with the bearing bracket 51. One end of the slide rod 136 may be disposed in contact with the lever arm 135 and the opposite end may be positioned in the path of a cam 138 carried on the periphery of the cam-carrier 75.

The lever arm 135 is maintained in contact with the slide rod 136 through the action of a spring 139 connected to an arm 141 fastened to the shaft 126 and to the bracket 51. The cam 138 may be properly positioned so that an actuation of the welding members is effected in the proper timed relation to mechanism for positioning relatively small diameter wire upon or over an inserted wire 142.

Mechanism for properly positioning a relatively small caliper wire 143 may comprise mechanism including a ram similar to that shown in Fig. 2 and as illustrated in Fig. 8, the wire 143 may be led from a spool (not shown), through the eyelet 53 and beneath the jaw 56. The operation of moving the wire forward may, therefore, be the same and motion transmitting mechanism may also be the same as that shown in Fig. 2. This operation, however, may include the formation of a hook or loop at the end of a wire and may include the wire-cutting device shown in Fig. 3 and described as part of the wire inserting head, illustrated in Fig. 2.

In addition to the cutting members, however, the arm 95 is provided with a member 144 (see Fig. 11) for bending the wire about a finger 145 which is mounted on one end of a shaft 146 rotatable in the hollow spindle 96. The opposite end of the shaft 146 projects from the spindle and is shaped to provide a lever arm 147. The lower arm 94 is provided with a guide member 148. The cutters are actuated by means of rods 101 and 102 which engage with cams 103 and 105 of the cam-carrier 75.

An additional rod 149 is, however, provided to operate the wire bending device and the rod is movable in the bracket 51 with an end thereof adapted to engage with a cam 151 on the cam-carrier 75 and with the lever arm 147 of the shaft 146. Thus, a rotation of the cam-carrier may operate to first project the ram to position an end of the wire 143 in the proper relation to the inserted wire 142 and a continued rotation of the shaft 76 and cam-carrier 75 causes the ram to retreat and the cutters to operate and the subsequent operation of the wire-bending mechanism to form a hook 150 at the end of the length of wire 150' as shown in Figs. 12 and 13.

It will be understood, however, that the cam 138 which operates the welding members, may be so positioned as to actuate the members to weld the wire 143 to the wire 142 prior to the severing and hook-bending operations.

The mechanism described for inserting or positioning a wire and for severing and forming a hook at the end thereof, has heretofore been employed in lamp-making machines and the operations thereof are well known.

After a wire has been welded, severed and a hook formed at the end thereof, mechanism may operate to rotate the stem a given number of degrees to position for insertion of another wire and for the welding operation, at which time the ram and other associated mechanism will operate to weld the wire 143 thereto. The means for intermittently rotating the stem may be of similar construction to the previously described mechanism for intermittently rotating the stem during the inserting operation shown in Fig. 2.

After the welding operations have been performed on each of the inserted wires, the conveyor may be rotated to bring the stem to position "A" at which it is unloaded. Any suitable means may be provided for holding the conveyor 18 in given relation to the work performing mechanism and as indicated in Fig. 1, such mechanism may comprise a latch 152. The latch may include an arm 153 pivoted on a pin 154 and having a finger piece 155. A spring 156 may normally operate to move the arm toward the conveyor and each arm of the conveyor may be provided with a lug 157 for disposition in a notch 158 in the arm 153. Thus as a stem-holder is moved to position, the latch will act to retain the conveyor from rotary movement.

An operator may readily release the conveyor by moving the latch in opposition to the spring 156 to rotate a stem-holder progressively throughout the several stations.

The various mechanisms for performing the several operations upon a stem may be driven by any suitable interposed machine elements deriving movement from a source of power, such, for example, as a motor (not shown), which may drive a beveled gear 159 positioned in mesh with another beveled gear 161 secured to a vertical shaft 162. The shaft 162 may be provided with a gear wheel 163 in mesh with a relatively large gear wheel 164 rotatable about the central shaft 17 of the machine. Suitably secured to and rotatable with the gear wheel 164 is provided a relatively small gear wheel 165.

Each operating mechanism at the stations B, C and D is provided with a shaft 76 having a gear wheel 77 secured to a lower end thereof. The gear wheels 77 are rotated through intermediate gears 166 and 167 mounted on stub shafts 168 and 169, respectively, the shaft 169 being also provided with a small gear wheel 171 in mesh with the central gear wheel 165. Thus the movement received from the driving shaft 159 is translated to various movable parts of the machine.

The coordination of the various machine elements and their proper relative operation may be readily effected by suitable gear ratios and by the proper arrangement of the cams and operating parts to perform the work in the proper order.

The foregoing sets forth a machine for automatically performing certain heretofore tedious and comparatively difficult operations. The labor attending the manual operations of providing the combination support of the type referred to herein and the skill required, made the production of such supports costly.

The present invention, therefore, by reason of the increased rate or production and the elimination of skilled operators makes it possible to manufacture lamp stems at a relatively low cost.

Although a preferred embodiment of the invention is shown and described herein, it is to be understood that modifications may be made therein without departing from the scope of the invention as set forth in the appended claims.

What is claimed is:

1. A machine for making lamp parts comprising support wire inserting mechanism, a wire welding device, means for disposing a lamp part in position for the insertion of a support wire therein, and means for transporting said part in operative relation to said welding device for the union of another wire with said inserted wire.

2. In a lamp making machine the combination of means for supporting a lamp part, means for automatically inserting a wire into a lamp part, means for securing another wire to the inserted wire to provide a support-member, means for forming a loop at the end of said member and means for progressively moving the said supported lamp part in operative relation to said respective means.

3. In a lamp making machine the combination of a movable support for a lamp part, means for inserting a wire into said part, means for welding another wire to the inserted wire to provide a support-member and means for moving said support to position a lamp part progressively in operative relation to said respective means.

4. In a lamp making machine the combination of a support for a lamp part, means for inserting a wire into said part, means for welding another wire to the inserted wire to provide a support-member, means for forming a hook at the free end of said support-member and means for causing a relative movement between said support and the respective means above mentioned to position the part progressively in operative relation to the said means.

5. In a lamp making machine the combination of a support for a lamp part, mechanism for automatically inserting a wire into said part, mechanism for shaping the free end of said inserted wire, mechanism for securing another wire to the shaped end to provide a support-member, and means for effecting a relative movement between said support and said mechanisms to effect a progressive movement of said support to position a lamp part in operative relation to said mechanisms.

6. In a lamp making machine the combination of a support for a lamp part, mechanism for automatically inserting a wire into said part, mechanism for shaping the free end of said inserted wire, mechanism for securing another wire to the shaped end to provide a support-member, mechanism for forming a loop at the free end of said support-member, and means for moving said support to position a lamp part progressively in operative relation to said mechanisms.

7. In a lamp making machine the combination of a support for a lamp part, mechanism for automatically inserting a wire into said part, mechanism for shaping an end of said inserted wire to facilitate a welding operation, mechanism for welding another wire to said inserted wire, and means for moving said support to position a lamp part successively in operative relation to said mechanisms.

8. In a lamp making machine the combination of a support for a lamp part, mechanism for automatically inserting a wire into said part, mechanism for shaping an end of said inserted wire to facilitate a welding operation, mechanism for welding another wire to said inserted wire to provide a support member, mechanism for forming a loop at the end of said support-member, means for operating said mechanisms and means for moving said support progressively and in timed relation to said mechanisms for the performance of the various operations.

9. In a lamp making machine the combination of a support for a lamp part, mechanism for inserting a wire into said part, mechanism for automatically compressing the free end of said inserted wire to facilitate a welding operation, mechanism for welding another wire to said inserted wire to provide a support-member, means for actuating said mechanisms and means for moving said support to position said lamp part in operative relation to said mechanisms.

10. A lamp making machine comprising a wire inserting mechanism, a lamp part positioned to receive a wire from said inserting mechanism, means for compressing the free end of an inserted wire, means for welding another wire to the compressed portion of said inserted wire, loop-forming mechanism operable to form a loop at the free end of the last mentioned wire, and means for transferring said lamp part from said inserting mechanism into operative relation with said respective means.

11. A lamp making machine comprising a holder for a lamp part, support wire inserting mechanism and means for actuating the same to insert a wire into said part, means for compressing the free end of said inserted wire, means for moving said lamp part to operative relation with said compressing means and means for actuating the same to compress said wire, and means for welding another wire to the compressed part of the inserted wire.

12. A lamp making machine comprising a support for a lamp part, mechanism for inserting a wire into said part, means for compressing the free end of a wire inserted into said lamp part, a welding device, means for moving the lamp part to position the inserted wire adjacent to the welding device, means for moving another wire adjacent to the inserted wire, means for actuating the welding device to unite the wires, and hook-forming mechanism operable to form a hook at the exposed end of the last mentioned wire.

13. A lamp making machine comprising a support for a lamp part, mechanism for inserting a wire into said part, means for forming a groove in the free end of the inserted wire, means for feeding second wire, means for moving the lamp part to position the grooved end of the inserted wire adjacent to the second wire and means for welding the wires together.

14. A lamp making machine comprising means for supporting a lamp part, mechanism for inserting a wire into said part, mechanism for feeding another wire, means for changing the relative position of said inserting mechanism and said lamp part to position the inserted wire adjacent to the wire-feeding mechanism, and means for welding a wire discharged from said feeding mechanism to an exposed portion of the inserted wire.

15. A lamp making machine comprising means for supporting a lamp part, mechanism for inserting a wire into said part, mechanism for feeding a second wire, means for moving said lamp part to position the inserted wire in operative relation to said wire feeding-mechanism, means for actuating said feeding mechanism to dispose a wire adjacent the inserted wire and means for welding the two wires together.

16. A lamp making machine comprising means for supporting a lamp part, mechanism for inserting a wire into said part, mechanism for feeding a second wire, means for moving said lamp part to position the inserted wire in operative relation to said wire feeding-mechanism, means for actuating said feeding mechanism to dispose a wire adjacent the inserted wire, means for welding the two wires together, and means for forming a hook at the end of said second wire.

17. A lamp making machine comprising a lamp part support, wire inserting mechanism disposed in operative relation to said support, means for intermittently rotating said support for the radial insertion of a plurality of support wires therein, mechanism for feeding wires intermittently, means for moving said support to position the lamp part in operative relation to said wire-feeding mechanism, a welding device, means for intermittently rotating said support to position the inserted wires successively adjacent to said wire-feeding mechanism and means for welding wires fed from said feeding mechanism to the wire in said lamp part.

18. A lamp making machine comprising a lamp stem support, mechanism for inserting a wire into a stem held in said support, wire compressing mechanism, means for moving said inserted wire in operative relation to said compressing mechanism, means for operating said mechanism to compress an end of said inserted wire, wire-positioning mechanism, means for moving said stem to position said compressed wire in operative relation to said wire-positioning mechanism, means for operating said mechanism to position an end of a wire over said compressed portion of the inserted wire and means for welding the positioned wire to the inserted wire.

19. A lamp making machine comprising a lamp stem support, mechanism for inserting a wire into a stem held in said support, wire compressing mechanism, means for moving said inserted wire in operative relation to said compressing mechanism, means for operating said mechanism to compress an end of said inserted wire, wire positioning mechanism, means for moving said stem to position said compressed wire in operative relation to said wire positioning mechanism, means for operating said mechanism to position an end of a wire over said compressed portion of the inserted wire, and means for forming a hook at the end of the positioned wire.

20. A lamp making machine comprising means for inserting a wire into a stem, means for compressing the end of an inserted wire, means for positioning another wire adjacent to the compressed portion of the said inserted wire, means for welding the said wires together, means for forming a hook at the end of the united wires and means for rotating the stem intermittently for the performance of the above mentioned operations to provide a stem with a plurality of radially inserted wires.

21. A machine comprising means for supporting a wire, means for forming a groove in the supported wire, a welding device, means for feeding a second wire, means for moving said supported wire to position the groove adjacent to the said second wire and means for actuating the welding device to unite the two wires.

22. A machine comprising means for supporting a a wire, means for reforming an end of said supported wire to facilitate the union of another wire therewith, a welding device, means for feeding a second wire, means for disposing the reformed end of the supported wire and a portion of the second wire in adjacent relation and means for actuating the welding device to unite the wires.

In testimony whereof, I have hereunto subscribed my name this 28th day of December, 1923.

JOHN JOSEPH HIGGINS.